(12) United States Patent
Ma et al.

(10) Patent No.: US 10,777,812 B2
(45) Date of Patent: Sep. 15, 2020

(54) ANODE MATERIALS FOR LITHIUM ION BATTERIES AND METHODS OF MAKING AND USING SAME

(71) Applicant: JOHNSON MATTHEY PUBLIC COMPANY LIMITED, London (GB)

(72) Inventors: Xiaohua Ma, Woodbury, MN (US); Mark N. Obrovac, Nova Scotia (CA)

(73) Assignee: Johnson Matthey Public Limited Company, London (GB)

( * ) Notice: Subject to any disclaimer, the term of this patent is extended or adjusted under 35 U.S.C. 154(b) by 80 days.

(21) Appl. No.: 16/063,708

(22) PCT Filed: Dec. 15, 2016

(86) PCT No.: PCT/US2016/066779
§ 371 (c)(1),
(2) Date: Jun. 19, 2018

(87) PCT Pub. No.: WO2017/112502
PCT Pub. Date: Jun. 29, 2017

(65) Prior Publication Data
US 2018/0375095 A1    Dec. 27, 2018

Related U.S. Application Data

(60) Provisional application No. 62/270,863, filed on Dec. 22, 2015.

(51) Int. Cl.
*H01M 4/00* (2006.01)
*H01M 4/38* (2006.01)
(Continued)

(52) U.S. Cl.
CPC ............ *H01M 4/386* (2013.01); *C01G 33/00* (2013.01); *H01M 4/133* (2013.01); *H01M 4/134* (2013.01);
(Continued)

(58) Field of Classification Search
CPC .... H01M 4/386; H01M 4/628; H01M 10/052; H01M 2004/021; H01M 2004/027; C01G 33/00
See application file for complete search history.

(56) References Cited

U.S. PATENT DOCUMENTS 6,680,145 B2   1/2004   Obrovac
7,906,238 B2   3/2011   Le
(Continued)

FOREIGN PATENT DOCUMENTS

JP    2004185991    11/2010

OTHER PUBLICATIONS

Du, "Combinatorial Investigations of Ni-Si Negative Electrode Materials for Li-Ion Batteries", Journal of The Electrochemical Society, 2015, vol. 162, No. 09, pp. A1858-A1863.
(Continued)

*Primary Examiner* — Cynthia H Kelly
*Assistant Examiner* — Monique M Wills
(74) *Attorney, Agent, or Firm* — BakerHostetler

(57) ABSTRACT

An electrochemically active material includes an active phase that includes silicon, and at least one inactive phase having a Scherrer Grain Size of greater than 5 nanometers. Each inactive phase of the material having a Scherrer Grain Size of greater than 5 nanometers has a lattice mismatch to $Li_{15}Si_4$ of greater than 5%.

15 Claims, 1 Drawing Sheet

(51) Int. Cl.
*H01M 4/62* (2006.01)
*C01G 33/00* (2006.01)
*H01M 4/134* (2010.01)
*H01M 4/36* (2006.01)
*H01M 4/133* (2010.01)
*H01M 4/587* (2010.01)
*H01M 4/583* (2010.01)
*H01M 4/66* (2006.01)
*H01M 10/052* (2010.01)
*H01M 10/058* (2010.01)
*H01M 4/02* (2006.01)
*H01M 10/0525* (2010.01)

(52) U.S. Cl.
CPC .......... *H01M 4/364* (2013.01); *H01M 4/382* (2013.01); *H01M 4/583* (2013.01); *H01M 4/587* (2013.01); *H01M 4/62* (2013.01); *H01M 4/621* (2013.01); *H01M 4/628* (2013.01); *H01M 4/661* (2013.01); *H01M 10/052* (2013.01); *H01M 10/058* (2013.01); *H01M 10/0525* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 8,257,864 B2 | 9/2012 | Dahn |
| 8,753,545 B2 | 6/2014 | Obrovac |
| 10,553,865 B2 | 2/2020 | Chu |
| 2003/0211390 A1 | 11/2003 | Dahn |
| 2006/0286458 A1* | 12/2006 | Sato ............... H01M 4/131 429/231.95 |
| 2008/0206641 A1 | 8/2008 | Christensen |
| 2010/0288077 A1 | 11/2010 | Le |
| 2010/0288982 A1 | 11/2010 | Le et al. |
| 2012/0219860 A1 | 8/2012 | Wang |
| 2015/0147649 A1* | 5/2015 | Jung ............... H01M 4/1397 429/220 |
| 2015/0214544 A1 | 7/2015 | Kwon |
| 2016/0181598 A1* | 6/2016 | Suh ............... H01M 4/362 429/219 |

OTHER PUBLICATIONS

International Search Report for PCT International Application No. PCT/US2016/066779, dated Mar. 2, 2017, 2 pages.

* cited by examiner

ABSTRACT

ANODE MATERIALS FOR LITHIUM ION BATTERIES AND METHODS OF MAKING AND USING SAME

CROSS REFERENCE TO RELATED APPLICATIONS

This application is a national stage filing under 35 U.S.C. 371 of PCT/US2016/066779, filed Dec. 15, 2016, which claims the benefit of U.S. Provisional Application No. 62/270,863, filed Dec. 22, 2015, the disclosure of which is incorporated by reference in their entirety herein.

FIELD

The present disclosure relates to compositions useful in anodes for lithium ion batteries and methods for preparing and using the same.

BACKGROUND

Various anode compositions have been introduced for use in lithium-ion batteries. Such compositions are described, for example, in U.S. Pat. Nos. 7,906,238 and 8,753,545.

SUMMARY

In some embodiments, an electrochemically active material is provided. The electrochemically active material includes an active phase that includes silicon; and at least one inactive phase having a Scherrer Grain Size of greater than 5 nanometers. Each inactive phase of the material having a Scherrer Grain Size of greater than 5 nanometers has a lattice mismatch to $Li_{15}Si_4$ of greater than 5%.

In some embodiments, an electrode composition is provided. The electrode composition includes the above-described electrochemically active material and a binder.

In some embodiments, a negative electrode is provided. The negative electrode includes a current collector and the above-described electrode composition.

In some embodiments, an electrochemical cell is provided. The electrochemical cell includes the above-described negative electrode, a positive electrode comprising a positive electrode composition comprising lithium, and an electrolyte comprising lithium.

In some embodiments, a method of making an electrochemical cell is provided. The method includes providing a positive electrode comprising a positive electrode composition comprising lithium, providing a negative electrode as described above, providing an electrolyte comprising lithium, and incorporating the positive electrode, negative electrode, and the electrolyte into an electrochemical cell.

The above summary of the present disclosure is not intended to describe each embodiment of the present disclosure. The details of one or more embodiments of the disclosure are also set forth in the description below. Other features, objects, and advantages of the disclosure will be apparent from the description and from the claims.

BRIEF DESCRIPTION OF THE DRAWINGS

The disclosure may be more completely understood in consideration of the following detailed description of various embodiments of the disclosure in connection with the accompanying figures, in which.

DETAILED DESCRIPTION

Figure 1:
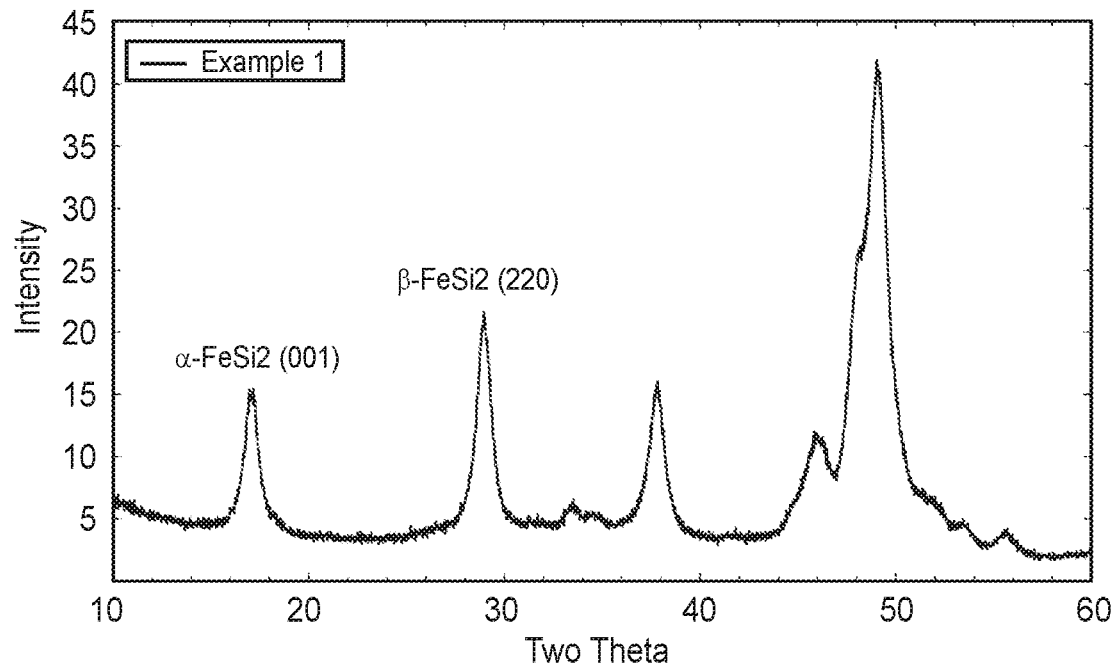
FIG. 1 shows the X-Ray Diffraction (XRD) pattern of a sample of Example 1.

Silicon (Si) based alloys are a promising alternative to graphite as anode materials for next generation high energy density lithium ion batteries due, at least in part, to their higher energy density. However, adequate cycle life remains a significant challenge to commercialization of silicon based alloys.

Over the last several years, several design parameters have emerged for Si-based materials for Li-ion batteries. When micron sized Si is fully lithiated it is known to form the crystalline $Li_{15}Si_4$ phase. The existence of this crystalline phase has been correlated with poor cycle life and its presence can be established by dQ/dV analysis of the voltage curve in a half cell. Active/inactive alloys are a well-established approach for suppressing the formation of $Li_{15}Si_4$. When the domain sizes of the active phase (e.g., Si) and the inactive phase (e.g. a metal silicide) are sufficiently small, the Si domains remain amorphous throughout lithiation and delithiation and the formation of $Li_{15}Si_4$ is suppressed. Recent discoveries have shown that the suppression of the formation of $Li_{15}Si_4$ is due strain/voltage coupling, where the strain stemming from the inactive phase lowers the lithiation potential and the formation of $Li_{15}Si_4$ is avoided. [Du, et al., J. Electrochem. Soc. 162(9), A1858-A1863 (2015)]

Surprisingly, it has been found that a key parameter for the design of a Si-based active/inactive material is the lattice mismatch between the inactive phase and $Li_{15}Si_4$. The greater the lattice mismatch between the inactive phase and crystalline $Li_{15}Si_4$, the greater the suppression of the formation of $Li_{15}Si_4$ and, in turn, the better the cycling. Generally, the present disclosure is directed to active/inactive materials with large lattice mismatches between the inactive phase and $Li_{15}Si_4$, resulting in enhanced suppression of the $Li_{15}Si_4$ phases and, consequently, improved cycling.

As a Si-based material is cycled, the formation of the crystalline $Li_{15}Si_4$ phase can increase with cycle number. A material in which the presence of the $Li_{15}Si_4$ phase, as determined by dQ/dV analysis, increases with cycle number is said to have an unstable microstructure. Cycling at elevated temperatures generally promotes microstructure changes. Therefore, an efficient way of quantifying the stability of the microstructure of Si-based material is by cycling the material at 45° C. and monitoring the presence of crystalline $Li_{15}Si_4$. The materials in accordance with some embodiments of the present disclosure are found to have surprisingly stable microstructures even when cycled at 45° C.

As used herein, the terms "lithiate" and "lithiation" refer to a process for adding lithium to an electrode material or electrochemically active phase;

the terms "delithiate" and "delithiation" refer to a process for removing lithium from an electrode material or electrochemically active phase;

the terms "charge" and "charging" refer to a process for providing electrochemical energy to a cell;

the terms "discharge" and "discharging" refer to a process for removing electrochemical energy from a cell, e.g., when using the cell to perform desired work;

the phrase "charge/discharge cycle" refers to a cycle wherein an electrochemical cell is fully charged, i.e. the cell attains it's upper cutoff voltage and the cathode is at about 100% state of charge, and is subsequently discharged to attain a lower cutoff voltage and the cathode is at about 100% depth of discharge;

the phrase "positive electrode" refers to an electrode (often called a cathode) where electrochemical reduction and lithiation occurs during a discharging process in a full cell the phrase "negative electrode" refers to an electrode (often called an anode) where electrochemical oxidation and delithiation occurs during a discharging process in a full cell;

the term "alloy" refers to a substance that includes any or all of metals, metalloids, or semimetals;

the phrase "electrochemically active material" refers to a material, which can include a single phase or a plurality of phases, that can electrochemically react or alloy with lithium under conditions possibly encountered during charging and discharging in a lithium ion battery (e.g., voltages between 0 V and 2 V versus lithium metal);

the phrase "electrochemically inactive material" refers to a material, which can include a single phase or a plurality of phases, that does not electrochemically react or alloy with lithium under conditions possibly encountered during charging and discharging in a lithium ion battery (e.g., voltages between 0 V and 2 V versus lithium metal);

the phrases "electrochemically active phase" or "active phase" refer to a phase of an electrochemically active material that can electrochemically react or alloy with lithium under conditions possibly encountered during charging and discharging in a lithium ion battery (e.g., voltages between 0 V and 2 V versus lithium metal);

the phrases "electrochemically inactive phase" or "inactive phase" refer to phases of an electrochemically active material that does not electrochemically react or alloy with lithium under conditions possibly encountered during charging and discharging in a lithium ion battery (e.g., voltages between 0 V and 2 V versus lithium metal);

the phrases "electrochemically active chemical element" or "active chemical element" refer to chemical elements that can electrochemically react or alloy with lithium under conditions possibly encountered during charging and discharging in a lithium ion battery (e.g., voltages between 0 V and 2 V versus lithium metal);

the phrase "conducting phase" refers to a phase that has substantially high electrical conductivity, including metal conductors, semi-metals, and semiconductors, but is not substantially electrochemically active;

the phrase "insulating phase" refers to a phase that does not substantially conduct electricity and is not substantially electrochemically active, but may or may not be ionically conductive;

the phrase "substantially homogeneous" refers to a material in which the components or domains of the material are sufficiently mixed with one another such that the make-up of one portion of the material is the same as that of any other portion of the material on a length scale of 100 nanometers or more; and the phrase "lattice mismatch to $Li_{15}Si_4$" refers to the lattice mismatch as determined in accordance with the calculations and analysis of the Examples of the present application.

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

In some embodiments, the present disclosure relates to an electrochemically active material for use in an electrochemical cell (e.g., a lithium ion battery). For example, the electrochemically active material may be incorporated into a negative electrode for a lithium ion battery.

In some embodiments, the electrochemically active material may include one or more active phases and one or more inactive phases. The active phases may be in the form of or include an active chemical element, an active alloy, or combinations thereof. The active phases may include silicon and one or more additional active chemical elements such as, for example, magnesium (Mg), calcium (Ca), strontium (Sr), silver (Ag), zinc (Zn), boron (B), aluminum (Al), tin (Sn), lead (Pb), antimony (Sb), bismuth (Bi), or combinations thereof. In some embodiments, the active phase may include silicon. In some embodiments, the active phase may include silicon and Sn. In some embodiments, the active phase may consist essentially of silicon.

In some embodiments, active phase may account for at least 30 vol. % or at least 40 vol. % of the active material based on the total volume of the active material; or between 30 vol. % and 70 vol. %, between 35 vol. % and 60 vol. %, between 35 vol. % and 55 vol. %, between 35 vol. % and 44 vol. %, or between 40 vol. % and 44 vol. %, based on the total volume of the active material.

In some embodiments the electrochemically active material may further include an electrochemically inactive phase. The electrochemically active phase and the electrochemically inactive phase may share at least one common phase boundary. In various embodiments, the electrochemically inactive phase may be in the form of or include one or more electrochemically inactive chemical elements, including transition metals (e.g., titanium, vanadium, chromium, manganese, iron, cobalt, nickel), alkaline earth metals, rare earth metals, or combinations thereof. In various embodiments, the electrochemically inactive phase may be in the form of an alloy. In various embodiments, the electrochemically inactive phase may include a transition metal or combination of transition metals. In some embodiments, the electrochemically inactive phase may include one or more active chemical elements, including tin, carbon, gallium, indium, silicon, germanium, lead, antimony, bismuth, or combinations thereof. In some embodiments, the electrochemically inactive phase may include compounds such as silicides, aluminides, borides, carbides, nitrides, phosphates or stannides. The electrochemically inactive phase may include oxides, such as titanium oxide, zinc oxide, silicon oxide, aluminum oxide or sodium-aluminum oxide. In some embodiments, the electrochemically inactive phase may include $TiSi_2$, $B_4Si$, $Mg_2Si$, $VSi_2$, $\beta\text{-}FeSi_2$, $Mn_{11}Si_{19}$, SiC, or combinations thereof.

In some embodiments, inactive phase may account for between 30 vol. % and 70 vol. %, between 40 vol. % and 60 vol. %, or between 40 vol. % and 55 vol. % of the active material, based on the total volume of the active material.

In some embodiments, the electrochemically active material may be represented by the following formula (I):

$$Si_xM_yC_z \qquad (I)$$

where x, y, and z are atomic percentages, x+y+z=100, x is 70 to 76, 72 to 76, or 73 to 75; M is one or more transition metal elements selected from Ti, V, Cr, Mn, Fe, Co, Ni, Cu, Zn, Mg, B, and C; y is 15 to 25, 15 to 19, or 16 to 18; and z is 2 to 15, 5 to 12, or 6 to 8.

In some embodiments, M is or includes iron, and the electrochemically active material includes at least an active phase that includes silicon, an iron di-silicide ($FeSi_2$) inactive phase, and a silicon carbide (SiC) inactive phase. In such embodiments, the silicon phase may be present in the active material in an amount of between 25 to 65 vol % or between 35 to 55 vol. %; the $FeSi_2$ phase may be present in the active material in an amount of between 35 to 60 vol % or between 43 to 47 vol. %; and the SiC phase may be present in the active material in an amount of between 4 to 15 vol % or between 8 to 13 vol. %, based on the total volume of the active material.

In some embodiments, each of the phases of the electrochemically active material (i.e., the active phase, inactive phase, or any other phase of the active material) may include or be in the form of one or more grains. In some embodiments, the Scherrer grain size of each of the phases of the active material is no greater than 50 nanometers, no greater than 20 nanometers, no greater than 15 nanometers, no greater than 10 nanometers, or no greater than 5 nanometers. As used herein, the Scherrer grain size of a phase of an active material is determined, as is readily understood by those skilled in the art, by X-ray diffraction and the Scherrer equation As discussed above, it was discovered that lattice mismatch to crystalline $Li_{15}Si_4$ is relevant to cycling performance. In this regard, in some embodiments, the electrochemically active material may include one or more inactive phases having a Scherrer grain size of greater than 5 nanometers, greater than 8 nanometers, or greater than 15 nanometers. Further, in some embodiments, each inactive phase of the electrochemically active material having a Scherrer grain size of greater than 5, 8, or 15 nanometers may have a lattice mismatch to crystalline $Li_{15}Si_4$ of greater than 5%, greater than 10%, or greater than 20%; or between 5 and 50%, between 5 and 30%, or between 5 and 15%.

Silicides are the most common inactive phases in silicon based alloys. Table 1 below lists the lattice mismatch of some common silicides to $Li_{15}Si_4$. Among them, $TiSi_2$, $B_4Si$, $Mg_2Si$, $VSi_2$, $\beta\text{-}FeSi_2$ have a very large lattice mismatch with $Li_{15}Si_4$, and $Mn_{11}Si_{19}$ also shows a significant mismatch. It has been discovered that phase mismatches are beneficial to prohibit $Li_{15}Si_4$ crystallization when such mismatched phases are in a nano-crystalline form (e.g., Scherrer grain sizes between 5 and 15 nanometers, or 8 and 15 nanometers), as opposed to amorphous or nearly amorphous (e.g., Scherrer grain sizes less than 5 nanometers). For example, in a Si—Fe—C material prepared by mechanical milling, the silicon carbide (SiC) inactive phase may be substantially amorphous with a Scherrer grain sizes of less than 5 nanometers, while the iron di-silicide ($FeSi_2$) inactive phase may be nano-crystalline with Scherrer grain sizes in the range of 8-15 nanometers. Though the lattice mismatch between SiC and $Li_{15}Si_4$ is smaller than 5%, it will not facilitate $Li_{15}Si_4$ crystallization as the SiC is substantially amorphous. For the nanocrystalline inactive phase $FeSi_2$, however, it has been discovered that lattice mismatch is important. If $\alpha\text{-}FeSi_2$ is present, its neighboring $Li_{15}Si_4$ has a tendency to crystallize. Thus, it has been discovered that the total volume of $\beta\text{-}FeSi_2$ and SiC should be sufficiently high enough such that most of the Si domains are neighbored by $\beta\text{-}FeSi_2$ and SiC rather than $\alpha\text{-}FeSi_2$.

In some embodiments, the one or more inactive phases having a Scherrer grain size of greater than 5, 8, or 15 nanometers include one or more silicides. For example, such inactive phases may include $TiSi_2$, $B_4Si$, $Mg_2Si$, $VSi_2$, $\beta\text{-}FeSi_2$, $Mn_{11}Si_{19}$, or combinations thereof. In one embodiment, the one or more inactive phases having a Scherrer grain size of greater than 5, 8, or 15 nanometers include or consist essentially of $\beta\text{-}FeSi_2$.

In embodiments in which the electrochemically active material includes one or more inactive silicide phases having a Scherrer grain size of greater than 5, 8, or 15 nanometers, the inactive silicide phase(s), and any additional inactive phases of the material having a Scherrer Grain Size of less than 5, 8, or 15 nanometers may, collectively, be present in the electrochemically active material in an amount of greater than 17.5 vol. %, 22 vol. %, or 25 vol. %, based on the total volume of the electrochemically active material; or between 17 and 60 vol. %, between 22 and 50 vol. %, or between 25 and 50 vol. %, based on the total volume of the electrochemically active material.

In some embodiments, the phases may be distributed substantially homogeneously throughout the active material, including the surface and bulk of the material.

In some embodiments, the electrochemically active material may take the form of particles. The particles may have a diameter (or length of longest dimension) that is no greater than 60 μm, no greater than 40 μm, no greater than 20 μm, no greater than 10 μm, no greater than 7 μm, or even smaller; at least 0.5 μm, at least 1 μm, at least 2 μm, at least 5 μm, or at least 10 μm or even larger; or 0.5 to 10 μm, 1 to 10 μm, 2 to 10 μm, 40 to 60 μm, 1 to 40 μm, 2 to 40 μm, 10 to 40 μm, 5 to 20 μm, 10 to 20 μm, 1 to 30 μm, 1 to 20 μm, 1 to 10 μm, 0.5 to 30 μm, 0.5 to 20 μm, or 0.5 to 10 μm.

In some embodiments the electrochemically active material may take the form of particles having low surface area. The particles may have a surface area that is less than 20 $m^2/g$, less than 12 $m^2/g$, less than 10 $m^2/g$, less than 5 $m^2/g$, less than 4 $m^2/g$, or even less than 2 $m^2/g$.

In some embodiments, the active material (e.g., in the form of particles) may bear on an exterior surface thereof a coating that at least partially surrounds the active material. By "at least partially surrounds" it is meant that there is a common boundary between the coating and the exterior of the active material. The coating can function as a chemically protective layer and can stabilize, physically and/or chemically, the components of the active material. Exemplary materials useful for coatings include amorphous carbon, graphitic carbon, LiPON glass, phosphates such as lithium phosphate ($Li_2PO_3$), lithium metaphosphate ($LiPO_3$), lithium dithionate ($LiS_2O_4$), lithium fluoride (LiF), lithium metasilicate ($LiSiO_3$), and lithium orthosilicate ($Li_2SiO_4$). The coating can be applied by milling, solution deposition, vapor phase processes, or other processes known to those of ordinary skill in the art.

In some embodiments, the present disclosure is further directed to negative electrode compositions for use in lithium ion batteries. The negative electrode compositions may include the above-described electrochemically active materials. The electrochemically active materials may be present in the negative electrode compositions in an amount of between 5 wt. % and 70 wt. %, between 10 wt. % and 60 wt. %, between 10 wt. % and 50 wt. %, between 15 wt. % and 40 wt. %, or between 15 wt. % and 30 wt. %, based upon the total weight of the electrode composition. Additionally, the negative electrode compositions may include one or more additives such as binders, conductive diluents, fillers, adhesion promoters, thickening agents for coating viscosity modification such as carboxymethylcellulose, polyacrylic acid, polyvinylidene fluoride, lithium polyacrylate, carbon black, or other additives known by those skilled in the art.

In illustrative embodiments, the negative electrode compositions may include an electrically conductive diluent to facilitate electron transfer from the composition to a current collector. Electrically conductive diluents include, for example, carbons, powdered metal, metal nitrides, metal carbides, metal silicides, and metal borides, or combinations thereof. Representative electrically conductive carbon diluents include carbon blacks such as Super P and Super S carbon blacks (both from Timcal, Switzerland), Shawinigan Black (Chevron Chemical Co., Houston, Tex.), acetylene black, furnace black, lamp black, graphite, carbon fibers, carbon nanotubes, and combinations thereof. In some embodiments, the amount of conductive diluent in the electrode composition may be at least 2 wt. %, at least 6 wt. %, or at least 8 wt. %, or at least 20 wt. % based upon the total weight of the electrode coating; less than 5 wt. less than 2 wt. %, or less than 1 wt. % based upon the total weight of the electrode composition, or between 0.2 wt. % and 80 wt. %, between 0.5 wt. % and 50 wt. %, between 0.5 wt. % and 20 wt. %, or between 1 wt. % and 10 wt. %, based upon the total weight of the electrode composition.

In some embodiments, the negative electrode compositions may include graphite to improve the density and cycling performance, especially in calendered coatings, as described in U.S. Patent Application Publication 2008/0206641 by Christensen et al., which is herein incorporated by reference in its entirety. The graphite may be present in the negative electrode composition in an amount of greater than 10 wt. %, greater than 20 wt. %, greater than 50 wt. %, greater than 70 wt. % or even greater, based upon the total weight of the negative electrode composition; or between 20 wt. % and 90 wt. %, between 30 wt. % and 80 wt. %, between 40 wt. % and 60 wt. %, between 45 wt. % and 55 wt. %, between 80 wt. % and 90 wt. %, or between 85 wt. % and 90 wt. %, based upon the total weight of the electrode composition.

In some embodiments, the negative electrode compositions may also include a binder. Suitable binders include oxo-acids and their salts, such as sodium carboxymethylcellulose, polyacrylic acid, lithium polyacrylate, sodium polyacrylate, methyl acrylate/acrylic acid copolymers, lithium methyl acrylate/acrylate copolymers, and other optionally lithium or sodium neutralized polyacrylic acid copolymers. Other suitable binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly(alkyl vinyl ethers); perfluorinated poly(alkoxy vinyl ethers); or combinations thereof. Other suitable binders include polyimides such as the aromatic, aliphatic or cycloaliphatic polyimides and polyacrylates. The binder may be crosslinked. In some embodiments, the amount of binder in the electrode composition may be at least 3 wt. %, at least 5 wt. %, at least 10 wt. %, or at least 20 wt. % based upon the total weight of the electrode coating; less than 30 wt. %, less than 20 wt. %, or less than 10 wt. %, based upon the total weight of the electrode composition; or between 3 wt. % and 30 wt. %, between 3 wt. % and 20 wt. %, or between 3 wt. % and 10 wt. %, based upon the total weight of the electrode composition.

In some embodiments, the present disclosure is further directed to negative electrodes for use in lithium ion electrochemical cells. The negative electrodes may include a current collector having disposed thereon the above-described negative electrode composition. The current collector may be formed of a conductive material such as a metal (e.g., copper, aluminum, nickel), or a carbon composite.

In some embodiments, the present disclosure further relates to lithium ion electrochemical cells. In addition to the above-described negative electrodes, the electrochemical cells may include a positive electrode, an electrolyte, and a separator. In the cell, the electrolyte may be in contact with both the positive electrode and the negative electrode, and the positive electrode and the negative electrode are not in physical contact with each other; typically, they are separated by a polymeric separator film sandwiched between the electrodes.

In some embodiments, the positive electrode may include a current collector having disposed thereon a positive electrode composition that includes a lithium transition metal oxide intercalation compound such as $LiCoO_2$, $LiCO_{0.2}Ni_{0.8}O_2$, $LiMn_2O_4$, $LiFePO_4$, $LiNiO_2$, or lithium mixed metal oxides of manganese, nickel, and cobalt in any proportion. Blends of these materials can also be used in positive electrode compositions. Other exemplary cathode materials are disclosed in U.S. Pat. No. 6,680,145 (Obrovac et al.) and include transition metal grains in combination with lithium-containing grains. Suitable transition metal grains include, for example, iron, cobalt, chromium, nickel, vanadium, manganese, copper, zinc, zirconium, molybdenum, niobium, or combinations thereof with a grain size no greater than about 50 nanometers.

In various embodiments, useful electrolyte compositions may be in the form of a liquid, solid, or gel. The electrolyte compositions may include a salt and a solvent (or charge-carrying medium). Examples of solid electrolyte solvents include polymers such as polyethylene oxide, polytetrafluoroethylene, fluorine-containing copolymers, and combinations thereof. Examples of liquid electrolyte solvents include ethylene carbonate (EC), diethyl carbonate (DEC), dimethyl carbonate (DMC), ethyl methyl carbonate (EMC), propylene carbonate, fluoroethylene carbonate (FEC), tetrahydrofuran (THF), acetonitrile, and combinations thereof. In some embodiments the electrolyte solvent may comprise glymes, including monoglyme, diglyme and higher glymes, such as tetraglyme Examples of suitable lithium electrolyte salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof.

In some embodiments, the lithium ion electrochemical cells may further include a microporous separator, such as a microporous material available from Celgard LLC, Charlotte, N.C. The separator may be incorporated into the cell and used to prevent the contact of the negative electrode directly with the positive electrode.

The disclosed lithium ion electrochemical cells can be used in a variety of devices including, without limitation, portable computers, tablet displays, personal digital assistants, mobile telephones, motorized devices (e.g., personal or household appliances and vehicles), instruments, illumination devices (e.g., flashlights) and heating devices. One or more lithium ion electrochemical cells of this disclosure can be combined to provide a battery pack.

The present disclosure further relates to methods of making the above-described electrochemically active materials. In some embodiments, the materials can be made by methods known to produce films, ribbons or particles of metals or alloys including cold rolling, arc melting, resistance heating, ball milling, sputtering, chemical vapor deposition, thermal evaporation, atomization, induction heating or melt spinning. The above described active materials may also be made via the reduction of metal oxides or sulfides. In some embodiments, the electrochemically active materials of the present disclosure may be made in accordance with the methods discussed in U.S. Pat. No. 8,257,864, which is hereby incorporated by reference in its entirety.

The present disclosure further relates to methods of making negative electrodes that include the above-described negative electrode compositions. In some embodiments, the method may include mixing the above-described electrochemically active materials, along with any additives such as binders, conductive diluents, fillers, adhesion promoters, thickening agents for coating viscosity modification and other additives known by those skilled in the art, in a suitable coating solvent such as water or N-methylpyrrolidinone to form a coating dispersion or coating mixture. The dispersion may be mixed thoroughly and then applied to a foil current collector by any appropriate coating technique such as knife coating, notched bar coating, dip coating, spray coating, electrospray coating, or gravure coating. The current collectors may be thin foils of conductive metals such as, for example, copper, aluminum, stainless steel, or nickel foil. The slurry may be coated onto the current collector foil and then allowed to dry in air or vacuum, and optionally by drying in a heated oven, typically at about 80° to about 300° C. for about an hour to remove the solvent.

The present disclosure further relates to methods of making lithium ion electrochemical cells. In various embodiments, the method may include providing a negative electrode as described above, providing a positive electrode that includes lithium, and incorporating the negative electrode and the positive electrode into an electrochemical cell comprising a lithium-containing electrolyte.

In accordance with the compositions and methods of the present disclosure, electrochemically active materials having improved cycle performance may be obtained. In some embodiments, lithium-ion electrochemical cells that incorporate the negative electrodes of the present disclosure may prohibit the $Li_{15}Si_4$ formation significantly during lithiation to 5 mV vs. $Li/Li^+$ at elevated temperatures, such as 45° C. or greater which, in turn, may improve the capacity retention by 5%, 10%, or 20% or greater.

Listing of Embodiments

1. An electrochemically active material comprising:
an active phase comprising silicon;
at least one inactive phase having a Scherrer Grain Size of greater than 5 nanometers;
wherein each inactive phase of the material having a Scherrer Grain Size of greater than 5 nanometers has a lattice mismatch to $Li_{15}Si_4$ of greater than 5%.
2. The electrochemically active material according to embodiment 1, wherein the at least one inactive phase comprises an inactive silicide phase selected from $TiSi_2$, $B_4Si$, $Mg_2Si$, $VSi_2$, $\beta\text{-}FeSi_2$, $Mn_{11}Si_{19}$, and wherein the Scherrer Grain Size of the inactive silicide phase is greater than 5 nanometers.
3. The electrochemically active material according to embodiment 2, wherein (i) the inactive silicide phase(s), and (ii) any inactive phases of the material having a Scherrer Grain Size of less than 5 nanometers, are, together, present in the electrochemically active material in an amount of greater than 17.5 vol. %, based on the total volume of the material.
4. The electrochemically active material according to any one of embodiments 1-3, wherein the active phase is present in an amount of between 35 and 55 volume percent based on the total volume of the electrochemically active material.
5. The electrochemically active material according to any one of embodiments 1-4, wherein the at least one inactive phase comprises $FeSi_2$ and SiC.
6. The electrochemically active material according to embodiment 5, wherein the active phase is present in an amount of between 35 and 55 volume percent based on the total volume of the electrochemically active material, the $FeSi_2$ phase is present in an amount of between 35 and 60 volume percent based on the total volume of the electrochemically active material, and the SiC phase is present in an amount of between 4 and 15 volume percent based on the total volume of the electrochemically active material.
7. The electrochemically active material according to any one of embodiments 1-6, wherein the active phase is present in the active material in an amount of between 30 vol. % and 70 vol. %, based on the total volume of the active material.
8. The electrochemically active material according to any one of embodiments 1-7, wherein the inactive phases are present in the active material in an amount of between 30 vol. % and 70 vol. %, based on the total volume of the active material.
9. The electrochemically active material according to any one of embodiments 1-8, wherein the phases of the electrochemically active material are distributed substantially homogeneously throughout the electrochemically active material.
10. The electrochemically active material according to any one of embodiments 1-9, wherein the Scherrer grain size of each of the phases of the active material is no greater than 50 nanometers.
11. An electrode composition comprising:
the electrochemically active material according to any one of embodiments 1-10; and
a binder.
12. An electrode composition according to embodiment 11, further comprising graphite.
13. A negative electrode comprising:
the electrode composition according to any one of embodiments 11-12; and
a current collector.
14. An electrochemical cell comprising:
the negative electrode of embodiment 13;
a positive electrode comprising a positive electrode composition comprising lithium; and
an electrolyte comprising lithium.
15. An electronic device comprising the electrochemical cell according to embodiment 14.
16. A method of making an electrochemical cell, the method comprising:
providing a positive electrode comprising a positive electrode composition comprising lithium;
providing a negative electrode according to embodiment 13;

providing an electrolyte comprising lithium; and incorporating the positive electrode, negative electrode, and the electrolyte into an electrochemical cell.

The operation of the present disclosure will be further described with regard to the following detailed examples. These examples are offered to further illustrate various specific embodiments and techniques. It should be understood, however, that many variations and modifications may be made while remaining within the scope of the present disclosure.

EXAMPLES

The following examples are offered to aid in the understanding of the present disclosure and are not to be construed as limiting the scope thereof. Unless otherwise indicated, all parts and percentages are by weight.

Test Methods and Preparation Procedures

The following test methods and protocols were employed in the evaluation of the illustrative examples that follow.

Calculation of Lattice Mismatch

The lattice mismatch between $Li_{15}Si_4$ and its neighboring inactive phases was calculated as follows. The lattice of $Li_{15}Si_4$ is cubic, and all inactive phases of interests are among cubic, tetragonal, hexagonal or orthorhombic lattices. As the minimal lattice mismatch is usually between lattice planes with low Miller indices, only (100) and (110) planes of cubic $Li_{15}Si_4$ were considered. For cubic, tetragonal or orthorhombic inactive phases, (100), (010), (001), (110), (101) and (011) planes were used to calculate the lattice mismatch. For hexagonal or rhombohedral inactive phases, (100), (010), (001), (110), (101), (011) and ($1\bar{1}1$) planes were considered in lattice mismatch calculation. All the lattice planes considered are either square or rectangle. Therefore, the lattice mismatch between two lattice planes can be calculated by:

$$e^i = \left| \frac{a_1^i - a_0^i}{a_0^i} \right|, i = 1, 2, \quad \text{(Eq. 1)}$$

where $a_0^i$ is the lattice constant of $Li_{15}Si_4$ and $a_1^i$ the lattice constant of the inactive phase. Integer multiples of the unit cells were used to calculate the lattice mismatch, and the minimum $e = \sqrt{e^1 * e^1 + e^2 * e^2}$ was found using a Python script. For example, $NiSi_2$ (100) plane is a square lattice with a lattice constant $a_1^1 = a_1^2 = 5.406$ Å while for $Li_{15}Si_4$ (100), $a_0^1 = a_0^2 = 10.632$ Å. All the integer multiples of $a_1^1$ and $a_0^1$ were used to calculate the lattice mismatch. The minimum lattice mismatch between $NiSi_2$ (100) and $Li_{15}Si_4$ (100) planes was found to be e=2.4% when:

$$e^1 = e^2 = \left| \frac{2a_1^1 - a_0^1}{a_0^1} \right| = \left| \frac{10.812 - 10.632}{10.632} \right| = 1.7\% \quad \text{(Eq. 2)}$$

Lattice mismatch of each inactive phase plane to $Li_{15}Si_4$ (100) or (110) plane was calculated as is described above. The minimum mismatch among all those combinations is defined as the lattice mismatch between the inactive phase and $Li_{15}Si_4$ as listed in Table 1.

TABLE 1

Lattice mismatch of $Li_{15}Si_4$ with various inactive phases

| INACTIVE PHASE | LATTICE TYPE | LATTICE MISMATCH $e^1$ | $e^2$ |
|---|---|---|---|
| $TiSi_2$ | Orthorombic | 5.0% | 10.1% |
| $ZrSi_2$ | Orthorombic | 1.7% | 2.8% |
| $B_4Si$ | Rhombohedral | 2.9% | 5.3% |
| $Mg_2Si$ | Cubic | 15.0% | 15.0% |
| $VSi_2$ | Hexagonal | 14.0% | 4.4% |
| $Mn_{11}Si_{19}$ | Tetragonal | 3.8% | 0.7% |
| $CoSi_2$ | Cubic | 0.9% | 0.9% |
| $NiSi_2$ | Cubic | 1.7% | 1.7% |
| $Cu_{15}Si_4$ | Cubic | 0.6% | 0.6% |
| $ZnSi_2$ | Orthorombic | 2.1% | 1.9% |
| $\alpha\text{-}FeSi_2$ | Tetragonal | 1.0% | 1.0% |
| $\beta\text{-}FeSi_2$ | Orthorombic | 3.7% | 7.1% |
| SiC | Hexagonal | 0.4% | 0.6% |

X-Ray Diffraction (XRD)

A Siemens D500 diffractometer equipped with a copper target X-ray tube and a diffracted beam monochromator was used for the X-Ray Diffraction (XRD) measurements. The emitted X-rays utilized were the Cu K$\alpha$1 ($\lambda$=1.54051 Å) and Cu K$\alpha$2 ($\lambda$=1.54433 Å). The divergence and anti-scatter slits used were set both at 1o, while the receiving slit was set at 0.15°. The X-ray tube was powered to 45 kV at 40 mA. The scan ranges from 10° to 60° with a step of 0.02°. The dwelling time of each step was 12 seconds. The X-ray diffraction pattern was quantitatively analyzed by FullProf Rietveld refinement program (a free software developed by Laboratoire Léon Brillouin, France).

Preparation of Composites

Si alloy composite particles of the present invention were prepared by mechanical milling. Using the weights of each precursor provided in Table 2, silicon powder (available from Elkem Silicon Materials, Norway), iron powder (available from North American Hoganas Inc., Hollsopple, Pa.) and graphite powder (available from Asbury Graphite Mills Inc., NJ.) were milled together in an 8-feet diameter pebble mill with 16536 kg 15/32" steel media under an argon atmosphere. The mill was cooled by 5° C. chilling water at a flow rate of 24-29 gallon per minute. After milling for 56 hours, the powder was discharged and sieved for further characterization.

TABLE 2

Input weights of precursor materials

| Ex. | Si (kg) | Fe (kg) | C (kg) |
|---|---|---|---|
| 1 | 68.765 | 39.43 | 1.365 |
| 2 | 33.94 | 15.01 | 2.045 |
| 3 | 68.54 | 25.1 | 4.155 |
| 4 | 4.572 | 2.162 | 0.205 |
| CE1 | 34 | 15.89 | 2.045 |
| CE2 | 67.515 | 24.72 | 4.095 |
| CE3 | 68.495 | 23.68 | 4.16 |
| CE4 | 34.245 | 11.84 | 2.08 |
| CE5 | 4.572 | 2.13 | 0.069 |
| CE6 | 4.572 | 2.158 | 0.044 |

Preparation of Electrochemical Cells

A binder solution was prepared as follows: 35 wt % aqueous solution of polyacrylic acid (PAA) (250K MW, available from Sigma Aldrich), de-ionized water, and lithium hydroxide monohydrate (available from Sigma Aldrich) were mixed in a 1.00:2.48:0.20 weight ratio, and placed in a shaker for 5 hours. The resulting solution is a 10 wt % lithium polyacrylate (LiPAA) aqueous binder solution.

Electrodes comprising the Si alloy composite particles and lithium polyacrylate (LiPAA) with a 91/9 weight ratio were made by placing 1.82 g of each of Examples 1-10, 1.80 g of a 10% LiPAA aqueous solution prepared above in a 45-milliliter tungsten carbide vessel with four tungsten carbide balls (12.75 mm diameter) and mixing in a planetary micro mill (PULVERISETTE 7, available from Fritsch GmbH, Idon-Oberstein, Germany) at a speed setting of two for one hour. The resulting slurry was then coated onto a copper foil using a coating bar with a 0.003" gap and dried under vacuum at 120° C. for two hours. Coin cell electrodes were then punched from this foil.

Electrochemical 2325 coin cells were made with the composite particle electrodes versus a lithium foil counter/reference electrode. The electrolyte contains 10 wt % FEC and 90 wt % Selectilyte LP 57 (1M LiPF$_6$ in EC:EMC 30:70 w/w solution, available from BASF, Independence, Ohio). Two pieces of Celgard 2320 microporous membranes (available from Celgard LLC, Charlotte, N.C.) served as the separator. After crimping the cells closed, they were additionally sealed around the edges with Torr Seal (Varian, Inc., Palo Alto, Calif.) to prevent any leakage at 45° C.

Electrochemical Cell Testing

The coin cells were then cycled at 45° C. using a Maccor 4000 Series charger (available from Maccor Inc, Tulsa, Okla.). The first cycle was performed at C/10 with a C/40 trickle at 5 mV and a delithiation up to 1.5V, subsequent cycles were performed at C/4 with a C/20 trickle at 5 mV and a delithiation up to 0.9 V.

Results

X-Ray Diffraction

X-ray diffraction was used to identify α-FeSi$_2$, β-FeSi$_2$ phases as well as Si and SiC in the synthesized composites. FIG. 1 shows the diffraction pattern of Example 1. The diffraction peak of α-FeSi$_2$ (001) at around 17.03° and β-FeSi$_2$ (220) diffraction peak around 28.93° were fit to calculate the volume ratio of β-FeSi$_2$ to α-FeSi$_2$. Results are listed in Table 3.

TABLE 3

Final Composition of Examples 1-10

| Ex. | Si (VOL %) | FeSi$_2$ (VOL %) | SiC (VOL %) | β-FeSi$_2$/α-FeSi$_2$ (VOL %) |
|---|---|---|---|---|
| 1 | 36.0 | 59.0 | 5.0 | 1.270 |
| 2 | 41.7 | 43.1 | 15.2 | 0.339 |
| 3 | 49.2 | 35.6 | 15.2 | 0.069 |
| 4 | 43.2 | 45.6 | 11.2 | 0.422 |
| CE1 | 40.0 | 45.0 | 15.0 | 0.000 |
| CE2 | 52.1 | 34.6 | 13.3 | 0.044 |
| CE3 | 52.1 | 31.9 | 16.0 | 0.025 |
| CE4 | 52.3 | 32.7 | 15.0 | 0.034 |
| CE5 | 51.2 | 45.0 | 3.8 | 0.368 |
| CE6 | 51.9 | 45.7 | 2.4 | 0.345 |

Stability of dQ/dV During Cycling

Figure 2:
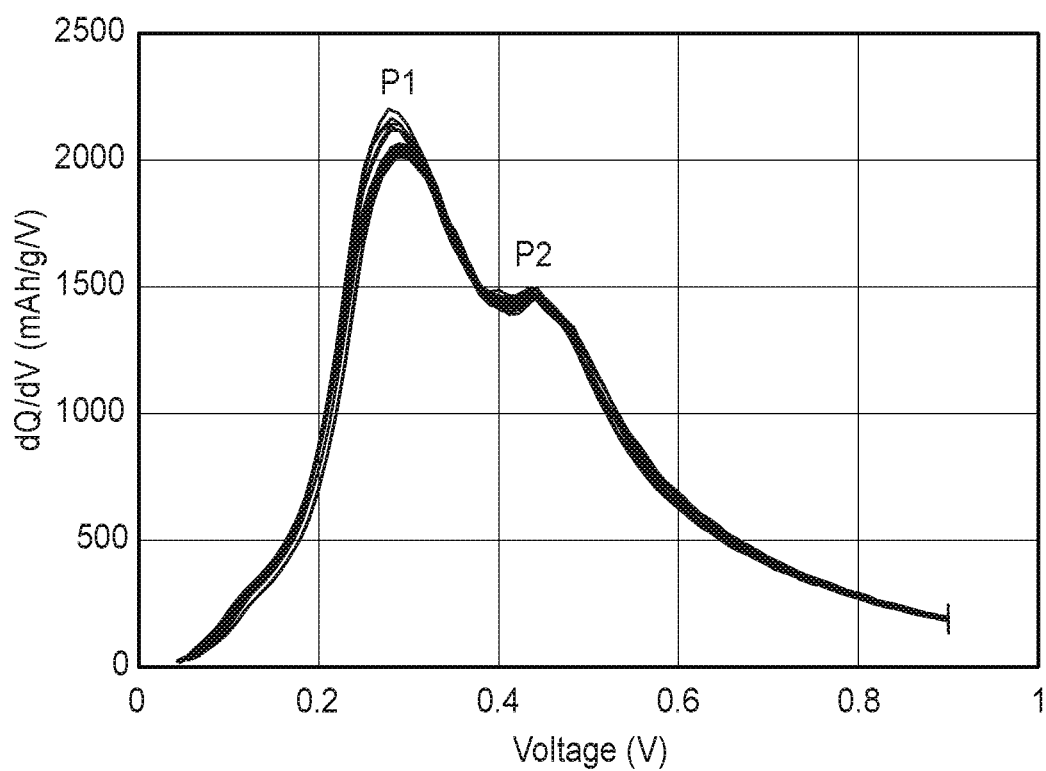
FIG. 2 shows the derivative of capacity divided by voltage (dQ/dV) of Example 1 during delithiation as a function of voltage.

The voltage profiles during cycling were used to characterize the stability of the alloy composites. The derivative of capacity by voltage (dQ/dV) of Example 1 during delithiation versus voltage is provided in FIG. 2. It shows two peaks in range of 0.005-0.4 V (P1) and 0.4-0.9 V (P2) respectively. The voltage curve is considered stable when the intensity of P2 is not changing significantly over cycling. Therefore, the ratio of P2 intensity at cycle 30 to P2 intensity at cycle 2, i.e. P2($30^{th}$)/P2($2^{nd}$), was used to measure the voltage stability.

Table 4 lists the volume content of β-FeSi$_2$+SiC, the ratio of P2($30^{th}$) to P2($2^{nd}$), and the first lithiation capacity of each composite. The results in Table 4 show that when the content of β-FeSi$_2$+SiC is above 17.5% in volume, P2($30^{th}$)/P2($2^{nd}$) becomes close to 1 indicating that the voltage curve is stable. On the other hand, there is no correlation found between the $1^{st}$ lithiation capacity and the voltage stability. These results lead to the conclusion that a higher volume of β-FeSi$_2$+SiC can stabilize the voltage curve of Si alloys.

TABLE 4

Cycling stability and first lithiation capacity vs. combined volume percentage of β-FeSi$_2$ and SiC

| Ex. | β-FeSi$_2$/α-FeSi$_2$ (VOL %) | β-FeSi$_2$ + SiC (Vol %) | P2($30^{th}$)/P2($2^{nd}$) | $1^{st}$ Lithiation Capacity (mAh/g) |
|---|---|---|---|---|
| 1 | 1.270 | 38.01 | 0.994 | 872 |
| 2 | 0.339 | 26.08 | 1.002 | 1237 |
| 3 | 0.069 | 17.52 | 1.092 | 1413 |
| 4 | 0.422 | 24.70 | 0.972 | 1421 |
| CE1 | 0.000 | 15.00 | 1.474 | 1070 |
| CE2 | 0.044 | 14.73 | 1.629 | 1364 |
| CE3 | 0.025 | 16.74 | 2.24 | 1578 |
| CE4 | 0.034 | 16.03 | 2.24 | 1578 |
| CE5 | 0.368 | 15.86 | 1.442 | 1451 |
| CE6 | 0.345 | 14.13 | 1.87 | 1448 |

Although specific embodiments have been illustrated and described herein for purposes of description of some embodiments, it will be appreciated by those of ordinary skill in the art that a wide variety of alternate and/or equivalent implementations may be substituted for the specific embodiments shown and described without departing from the scope of the present disclosure.

What is claimed:

1. An electrochemically active material comprising:
an active phase comprising silicon; and
at least one inactive phase having a Scherrer Grain Size of greater than 5 nanometers which includes or consists essentially of β-FeSi$_2$;
wherein each inactive phase of the material having a Scherrer Grain Size of greater than 5 nanometers has a lattice mismatch to Li$_{15}$Si$_4$ of greater than 5%.

2. The electrochemically active material according to claim 1, wherein (i) the inactive silicide phase(s), and (ii) any inactive phases of the material having a Scherrer Grain Size of less than 5 nanometers, are, together, present in the electrochemically active material in an amount of greater than 17.5 vol. %, based on the total volume of the material.

3. The electrochemically active material according to claim 1, wherein the active phase is present in an amount of between 35 and 55 volume percent based on the total volume of the electrochemically active material.

4. The electrochemically active material according to claim 1, wherein the at least one inactive phase further comprises SiC.

5. The electrochemically active material according to claim 4, wherein the active phase is present in an amount of between 35 and 55 volume percent based on the total volume of the electrochemically active material, the FeSi$_2$ phase is present in an amount of between 35 and 60 volume percent based on the total volume of the electrochemically active material, and the SiC phase is present in an amount of between 4 and 15 volume percent based on the total volume of the electrochemically active material.

6. The electrochemically active material according to claim 3, wherein the inactive phases are present in the active material in an amount of between 30 vol. % and 70 vol. %, based on the total volume of the active material.

7. The electrochemically active material according to claim 1, wherein the phases of the electrochemically active material are distributed substantially homogeneously throughout the electrochemically active material.

8. The electrochemically active material according to claim 1, wherein the Scherrer grain size of each of the phases of the active material is no greater than 50 nanometers.

9. An electrode composition comprising:
the electrochemically active material according to claim 1; and
a binder.

10. An electrode composition according to claim 9, further comprising graphite.

11. A negative electrode comprising:
the electrode composition according to any one of claims 9-10; and
a current collector.

12. An electrochemical cell comprising:
the negative electrode of claim 11;
a positive electrode comprising a positive electrode composition comprising lithium; and
an electrolyte comprising lithium.

13. An electronic device comprising the electrochemical cell according to claim 12.

14. A method of making an electrochemical cell, the method comprising:
providing a positive electrode comprising a positive electrode composition comprising lithium;
providing a negative electrode according to claim 11;
providing an electrolyte comprising lithium; and
incorporating the positive electrode, negative electrode, and the electrolyte into an electrochemical cell.

15. The electrochemically active material according to claim 4, wherein the at least one inactive phase further comprises $\alpha\text{-FeSi}_2$.

* * * * *